ELARTON & THOMAS.
Hay Rake and Loader.
No. 85,651.
Patented Jan'y 5, 1869.
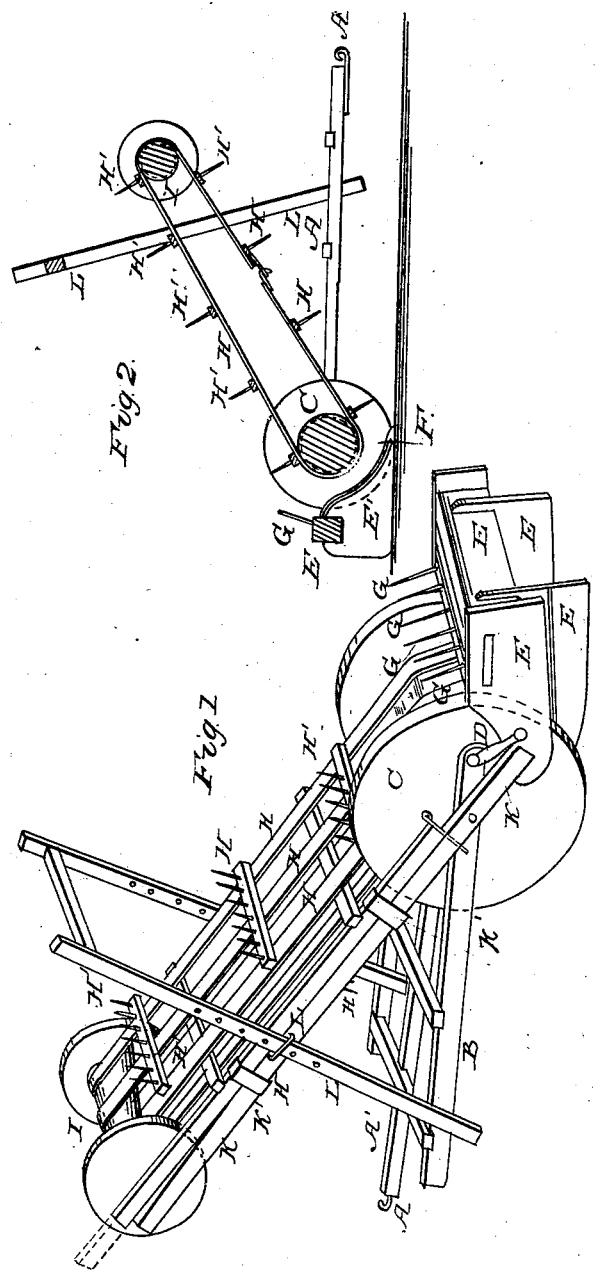

UNITED STATES PATENT OFFICE.

ROBERT ELARTON AND E. A. THOMAS, OF HILLSBOROUGH, IOWA.

IMPROVEMENT IN HAY RAKERS AND LOADERS.

*Specification forming part of Letters Patent No. 85,651, dated January 5, 1869.*

*To all whom it may concern:*

Be it known that we, ROBERT ELARTON, and E. A. THOMAS, of Hillsborough, in the county of Henry and State of Iowa, have invented a new and useful Improvement in Hay-Rakes and Loaders; and we do hereby declare that the following is a full, clear, and exact description of the same, reference being had to the annexed drawings, making part of this specification, in which—

Figure 1 is a perspective view, and Fig. 2 is a vertical longitudinal section.

The same letters in all the figures are used to indicate identical parts.

The loader and rake are attached to the hind bolster of a hay-wagon by the hook A on the beam A,' forming part of the frame B. This frame is attached to the axles of the drum C, the links D are pivoted to the end of the frame, and they are also pivoted to the rake E, which is carried upon runners E'. The curved teeth F are attached to the cross-beam of the rake-head projecting forward under the drum C, so as to gather the grass lying loose upon the stubble. Vertical teeth, G, are arranged on top of the rake to prevent the hay passing over the rake. As the hay is gathered upon the rake, it is seized by the revolving teeth H' of the elevator. These teeth are attached to cross-bars fastened to the elastic bands H, which are made of elastic india-rubber, and passed around the drum C, and also around the drum I, which rides over the rear end of the hay. This drum I is supported upon the frame K, constructed of two parallel beams of wood, one of which is attached to the axle of the lower drum, and the other receives the journals of the upper drum. Straps K', attached to the lower beam, encircle the other, serving as guides within which the upper beam may be extended longitudinally, so as to carry the drum I as far as may be necessary over the hay-wagon, the elastic bands permitting the frame K to be extended, the parts, when extended, being fastened by pins. The frame K may be adjusted vertically in the following manner: It is supported in an inclined position upon the side pieces L, attached to the frame B, and may be raised or lowered by adjusting the pins L' in one of a series of holes in the side pieces L, according to the height at which it is desirable to discharge the hay.

Our improved machine is distinguished from all others in use, in this, that we combine with the rake an elevating mechanism for loading the hay, said loader being vertically adjustable, and at the same time susceptible of extension to that degree which is necessary to carry it forward over the rear end of the hay-ladders as the elevating frame is raised, and it is this combination of mechanism which we desire to secure by Letters Patent.

What we claim as our invention, and desire to secure by Letters Patent, is—

A vertically-adjustable frame in a hay-loader, having a sectional construction, and so arranged in combination with extensible bolts that it may be extended by an operator standing below, so as to deliver the hay at different points longitudinally, or higher up on the stack or wagon, substantially as set forth.

In testimony whereof we have signed our names to this specification, in the presence of two subscribing witnesses.

ROBERT ELARTON.
E. A. THOMAS.

Witnesses:
E. J. HOENSHEL,
J. L. JORDAN.